United States Patent
Mutnuru et al.

(10) Patent No.: US 8,149,846 B2
(45) Date of Patent: Apr. 3, 2012

(54) DATA PROCESSING SYSTEM AND METHOD

(75) Inventors: Rishi Kaundinya Mutnuru, Bangalore Karnataka (IN); Timothy Noel Tatapudi, Bangalore Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 973 days.

(21) Appl. No.: 11/558,082

(22) Filed: Nov. 9, 2006

(65) Prior Publication Data

US 2007/0104099 A1    May 10, 2007

(30) Foreign Application Priority Data

Nov. 10, 2005  (IN) .......................... 3005/DEL/2005

(51) Int. Cl.
*H04L 12/56* (2006.01)

(52) U.S. Cl. .................... 370/395.4; 370/412; 709/224; 718/103; 719/310

(58) Field of Classification Search .................. 370/325, 370/395.1, 395.21, 395.4, 395.42, 395.43, 370/354, 359, 419, 420, 463, 487
See application file for complete search history.

(56) References Cited

U.S. PATENT DOCUMENTS

| | | | | |
|---|---|---|---|---|
| 5,812,534 A * | 9/1998 | Davis et al. | .................... | 370/260 |
| 5,896,371 A * | 4/1999 | Kobayashi et al. | ........... | 370/232 |
| 6,269,079 B1 * | 7/2001 | Marin et al. | .................... | 370/230 |
| 6,411,603 B1 * | 6/2002 | Ahuja et al. | .................... | 370/238 |
| 6,515,993 B1 * | 2/2003 | Williams et al. | ......... | 370/395.53 |
| 6,526,060 B1 * | 2/2003 | Hughes et al. | ............ | 370/395.4 |
| 6,570,883 B1 * | 5/2003 | Wong | ........................... | 370/412 |
| 7,075,927 B2 * | 7/2006 | Mo et al. | ....................... | 370/389 |

OTHER PUBLICATIONS

"TruCluster Server", Compaq Computer Corporation, Jun. 2001, pp. 1-116.
"TruCluster Server", Chapter 7, Hewlett-Packard Company, Sep. 2002, pp. 1-129.
OpenSSI (Single System Image) Clusters for Linux, Open SSI, Aug. 24, 2005, pp. 1.

* cited by examiner

*Primary Examiner* — Donald Mills

(57) ABSTRACT

A method is provided of managing cluster interconnect traffic, comprising prioritising the cluster interconnect traffic using at least two priorities, and distributing the prioritised cluster interconnect traffic according to the prioritising. Corresponding system and computer program product are also provided.

17 Claims, 3 Drawing Sheets

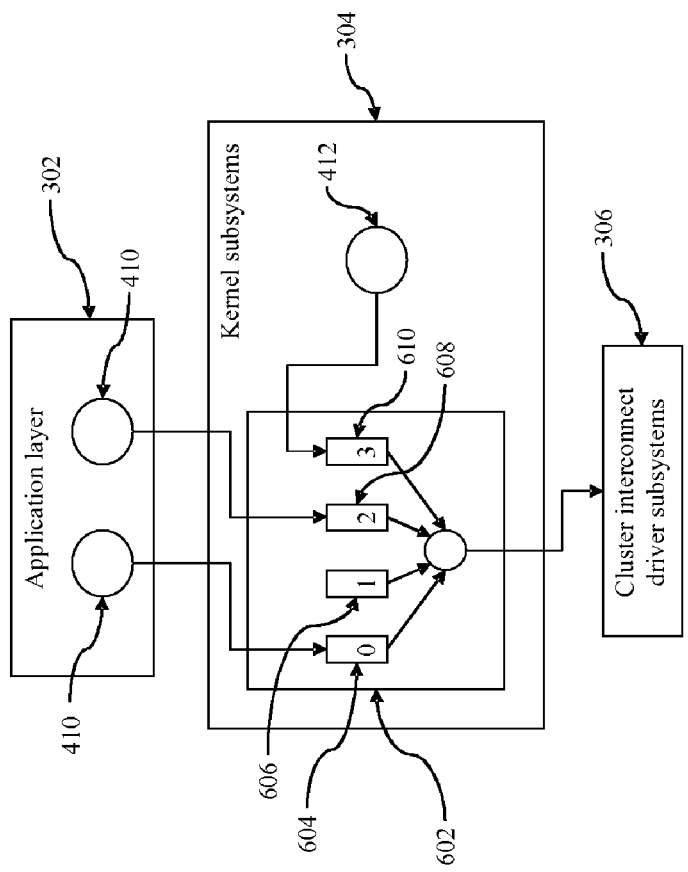

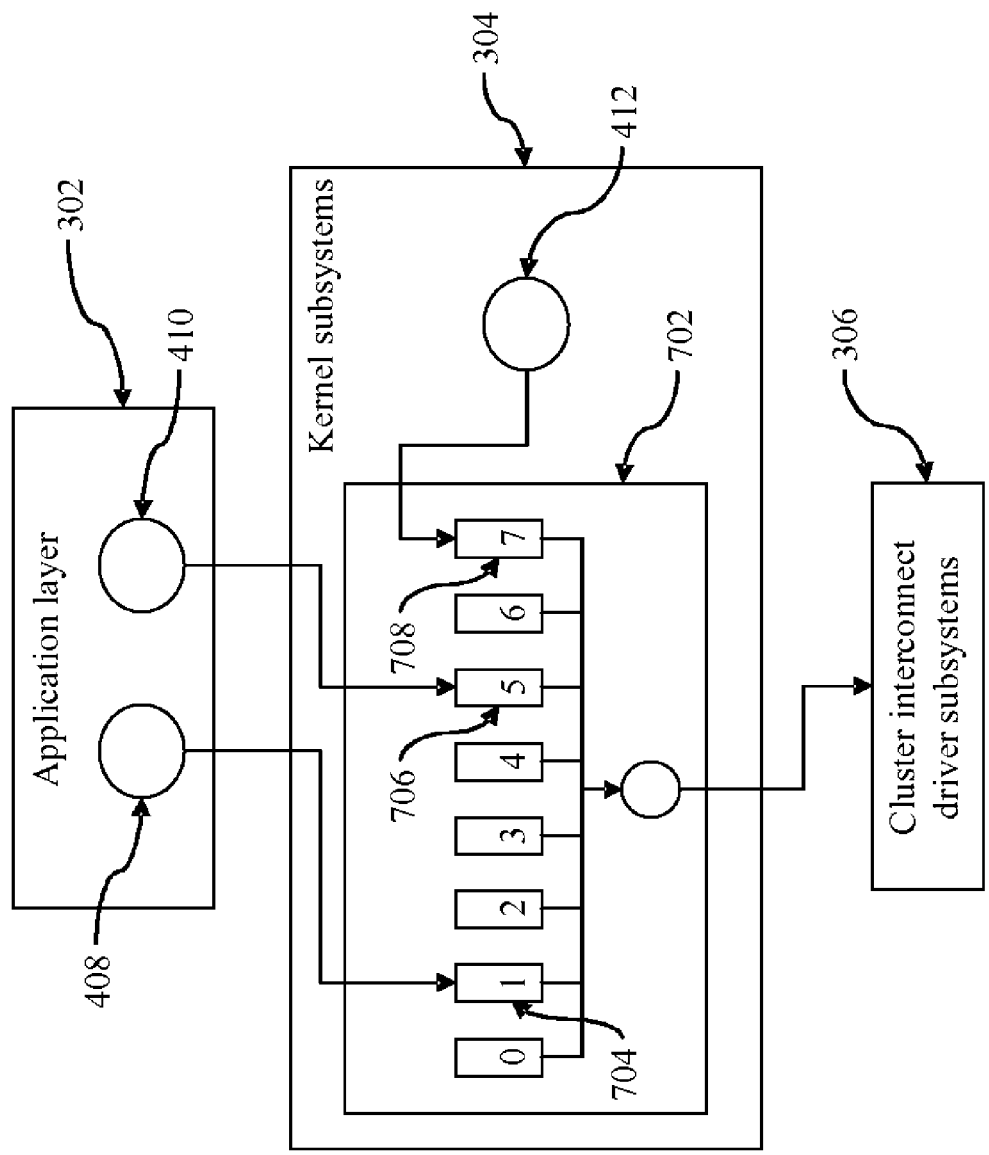

DATA PROCESSING SYSTEM AND METHOD

BACKGROUND TO THE INVENTION

It is known to provide a number of computing devices that can communicate with each other. The computing devices can be managed such that they appear to a user to behave as a single computer system. Such an arrangement is called a computing cluster, and the individual computing devices are known as nodes in the cluster. A computing cluster can, for example, provide cost savings when compared to a single supercomputer of comparable processing power.

FIG. 1 shows a simple computing cluster, comprising a plurality of nodes 102 to 108. Each node 102 to 108 is connected to one or more other nodes by an interconnect 110. The interconnects 110 may be a standard communication link such as, for example, Ethernet. Alternatively, the interconnects 110 may be specialist hardware such as Memory Channel, available from Hewlett-Packard company. Each node 102 to 108 includes appropriate hardware for communicating with the rest of the cluster via interconnects 110 such as, for example, Ethernet hardware. Data sent across at least one cluster interconnect 110 is known as cluster interconnect traffic. Traffic to be sent by a node 102 to 108 is first held in a first-in first-out (FIFO) queue (an interconnect queue) before being transmitted. Packets arriving at a node are also held in an incoming FIFO queue before being processed. If a process on a node creates traffic to be transmitted, but the interconnect queue is full and can hold no more traffic, then some or all of the traffic is dropped. As a result, some or all of the traffic is never transmitted.

Each node 102 to 108 also includes node management software which enables the computing device to function as a node in the cluster. Examples of existing node management software include TruCluster and OpenSSI.

Nodes of a computing cluster work together to achieve a common purpose. The following are the main types of computing cluster:
1. High performance (HP) clusters, which are constructed to run parallel programs (for example weather simulations and data mining) to accomplish a task given to the computing cluster. While a master node typically drives the cluster nodes, the nodes work together and communicate to accomplish the task.
2. Load-levelling clusters, which are constructed to allow a user on one node to spread his workload transparently to other nodes in the cluster. This can be very useful for computationally intensive, long running jobs that aren't massively parallel.
3. Web-service clusters, which implement a form of load levelling. Incoming web service requests are load-levelled between a set of standard servers. This could be regarded as a farm rather than a cluster since the server nodes don't typically work together.
4. Storage clusters, which consist of nodes that supply parallel, coherent and highly available access to file system data.
5. Database clusters, which consist of nodes that supply parallel, coherent and highly available access to a database. The database cluster is the most visible form of application specific clusters.
6. High Availability clusters, which are also often known as failover clusters. Resources, most importantly applications and nodes, are monitored and scripts are run when failure of a node is detected. Scripts are used to transfer applications and services running on the failed node onto another node.

Traffic often takes the form of a number of small data packets. The latency of a data packet is the time between creating the packet to be transmitted on one node and receipt of the packet at a destination node. Latency of a particular data packet can be affected by, for example, the speed of the interconnect 110 and the amount of traffic to be sent on the interconnect 110. If for example a burst of data packets is produced in a node at a rate faster than the speed of the interconnect 110, some data packets will be held in an interconnect queue while the data packets are transmitted across the interconnect 110 at a slower rate. The latency of the packets held in the queue will therefore increase when compared to packets which are transmitted instantly, for example if the interconnect queue is empty and there is little other traffic on the interconnect 110.

The computing cluster may include shared resources. An example is a shared mass storage device. Any of the nodes 102 to 108 in the cluster may access the device (for example to read or write data). However, only a single node may access the device at any one time. A node accesses the device by first locking the device such that no other node may access the device. The node then accesses the device, and then releases the device so that it is no longer locked and other nodes may attempt to lock and access the device. A distributed lock manager (DLM), which is a kernel subsystem, has the responsibility of managing resources in this way. Other examples of shared resources in a cluster include shared processors and shared memory.

Heavy traffic on the cluster interconnects could adversely affect the performance of the cluster. For example, heavy traffic could adversely affect the communication between crucial kernel subsystems or lead to poor utilisation of cluster resources.

For example, a shared resource locked and then released by a node will continue to effectively remain locked until other nodes are informed of the release. The information that the resource has been released might be delayed (and the latency of the data packets containing that information might increase) if traffic rates on the cluster interconnects are high. This could lead to wasted processor cycles on any node waiting for the resource to be released, and also could lead to poor utilisation of the shared resource as the resource is not used again until the waiting node is informed that the resource has been released.

Furthermore, operation of the cluster depends on many kernel subsystems communicating across the cluster. These subsystems periodically exchange messages. For example, the cluster management software TruCluster has a connection manager kernel subsystem. This subsystem generates health, status and synchronisation messages. The connection manager subsystem uses these messages to monitor the state of the cluster and its members and to coordinate membership and application placement within the cluster. If a cluster node generates health messages which are subject to high latency, then the node may be treated as non-responsive and may be restarted. Since the cluster node will then be non-operational, at least for a short time, this will lead to degradation of cluster performance.

A solution to these problems provided by TruCluster is to provide a high cost, low latency dedicated hardware interconnect structure such as Memory Channel. This is not always available to a cluster designer and is undesirable due to the high associated cost. When excessive traffic is produced by a cluster node and the interconnect queue is full, packets are dropped.

OpenSSI defines two channels, one used exclusively by crucial kernel services, and the other for all other types of traffic. Each channel is associated with a FIFO interconnect queue. There are therefore two interconnect FIFO queues. There is no queue throttling (dropping of traffic) on the channel used by crucial kernel services, as there is no size limit for the associated FIFO queue. The other channel is throttled, i.e. traffic will be dropped when interconnect traffic is high and the associated interconnect queue is full. This solution does not guarantee low latency for traffic in the channel used by crucial kernel services, as when there is a large amount of traffic in the queue the latency will be high.

It is an object of embodiments of the invention at least to mitigate at least some of the problems of the prior art.

BRIEF DESCRIPTION OF THE DRAWINGS

Embodiments of the invention will now be described by way of example only with reference to the accompanying drawings, in which:

FIG. 5 shows a typical IPv4 packet;

FIG. 6 shows the software layers of FIG. 3 in more detail when implemented according to a second embodiment of the present invention; and FIG. 7 shows the software layers of FIG. 3 in more detail when implemented according to a third embodiment of the present invention.

DETAILED DESCRIPTION OF EMBODIMENTS OF THE INVENTION

A first aspect of embodiments provides a method of managing cluster interconnect traffic comprising: prioritising the cluster interconnect traffic using at least two priorities; and distributing the prioritised cluster interconnect traffic according to the prioritising.

A second aspect of embodiments provides a system for managing cluster interconnect traffic comprising: means to prioritise the cluster interconnect traffic using at least two priorities; and means to distribute the prioritised cluster interconnect traffic according to the prioritising.

Embodiments of the technique disclosed here may be realised in the form of hardware, software or a combination of hardware and software. Suitably, embodiments of the disclosed technique provide a computer program comprising code for managing cluster interconnect traffic comprising: code for prioritising the cluster interconnect traffic using at least two priorities; and code for distributing the prioritised cluster interconnect traffic according to the prioritising. The computer program can be stored a number of ways such as, for example, on optically or magnetically readable media or in electronic devices such as, for example, ROMs, EPROM, memories device or any other volatile or non-volatile medium or device. Accordingly, embodiments provide computer storage storing such a computer program.

Further aspects of embodiments of the disclosed technique are defined in the appended claims and described herein.

Figure 2:
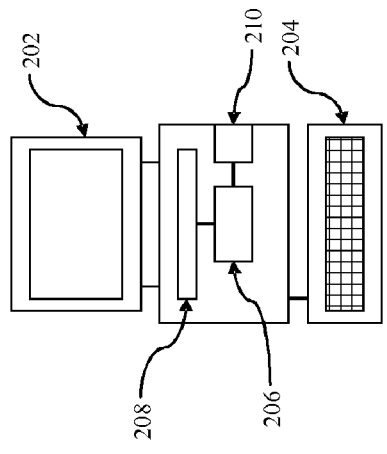
FIG. 2 shows a suitable computing device which can be used as a cluster computing node.

FIG. 2 shows a suitable computing device 200 which can be used as a computing cluster node 102 to 108. The computing device 200 includes a monitor 202 and an input device 204 such as a keyboard. The computing device also includes a data processor 206 which is in communication with a memory 208 and a communication device 210. The communication device allows the computing device 200 to communicate with other nodes 102 to 108 via interconnects 110.

Other forms of computing device can also be used. For example, the computing devices may not require a monitor 202 or input device 204. Examples of suitable computing devices which can be used as computing cluster nodes include, among others, HP ProLiant and BladeSystem servers.

Figure 1:
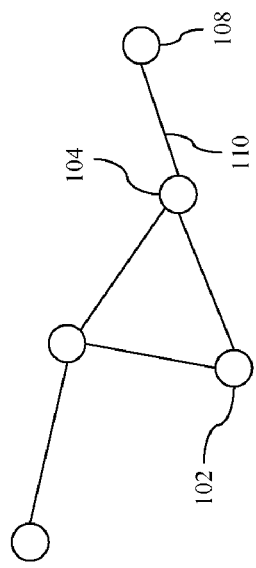
FIG. 1 shows an example of a simple computing cluster.

Embodiments of technique disclosed can be used to organise traffic between nodes of a cluster, for example the cluster shown in FIG. 1. Nodes of a computing cluster work together to achieve a common purpose. This is distinct from, for example, a known network of computing devices, where the network provides, for example, a common file system to the computing devices connected to the network, but the computing devices do not work together to achieve a common purpose.

Embodiments of the disclosure provide methods of and apparatus for organising critical traffic between cluster nodes 102 to 108. Critical traffic is traffic which, if dropped or transmitted with a high latency, has a detrimental effect on, for example, the efficiency of the cluster or the range of services provided by the cluster.

Traffic in a computing cluster is preferably treated in a different manner to traffic between, for example, computers in a communication network. It is desirable in a communication network to communicate data traffic with minimum latency. In contrast, data traffic in a cluster node is less likely to affect cluster performance when subject to high latency compared to a situation where critical traffic is subject to high latency. Embodiments of the present technique provide traffic management models which reduce the latency and/or increase the data rate of critical traffic rather than non-critical data traffic.

Traffic in a computing cluster is preferably also treated in a different manner to traffic between, for example, computers on a network which provides a common file system to the computers. Because the nodes of a computing cluster communicate with each other using critical traffic, the efficiency of the computing cluster depends, for example, on the speed (data rate and/or latency) of the critical traffic. Users of computers on a network would generally not notice small delays in retrieving, for example, files from a common file system if communications between the computers and a file server suffer from high latency. On the other hand, such delays in cluster interconnect traffic could have a detrimental effect on cluster performance.

An example of a kernel subsystem is the Distributed Lock Manager (DLM), which manages shared resources in a node as described previously. At least some traffic produced by the DLM, such as the traffic relating to release of a shared resource, could be classed as critical. For example, if traffic relating to release of a shared resource is delayed (i.e. has high latency), then a cluster node waiting for the shared resource will wait for a longer period until the traffic reaches the node. This could lead to wasted processor cycles on the waiting node, and also poor utilisation of the resource as the resource may not be used again until the waiting node knows that the resource is available.

Another example of a kernel subsystem is a Cluster File System (CFS) or Advanced File System (AdvFS). For example, with a CFS a storage device such as a hard disk is directly attached to a single node (known as a CFS server node), and the storage device can be used as a global storage device. Therefore nodes other than the CFS server node must send traffic to and/or receive traffic from the CFS server node to access the storage device. At least some of this traffic could be classed as critical traffic. For example, if a node not attached to the storage device must access data stored on the storage device, the node must send traffic to the CFS server node requesting data from the storage device, and the CFS server node must send traffic to the requesting node corresponding to the requested data. If the traffic corresponding to the request for data or the actual data is delayed (i.e. suffers from high latency), the requesting node may waste more processing cycles while it waits for the traffic corresponding to the requested data.

Another example of a kernel subsystem is the TruCluster connection management subsystem. The health messages produced by the connection manager subsystem could be classed as critical traffic. If the health messages from a node are subject to high latency, then the node might be treated by other nodes as being non-responsive. This may lead to the node being restarted, which will take the node out of the cluster at least for a short time. As there are then fewer nodes in the cluster, this will degrade cluster performance.

A data processor on a node can be considered to be a cluster resource. A shared storage device can be considered to be a shared cluster resource. Therefore embodiments of the technique disclosed here provide methods of and apparatus for managing cluster resources (such as, for example, node data processors and shared storage devices). Resource management traffic is traffic which relates to cluster resources. This includes, among others, health messages, DLM resource lock/release traffic and CFS file access traffic. Traffic related to managing cluster resources, for example traffic influencing performance of, and/or access to, a cluster resource and/or controlling a cluster resource, is considered in embodiments of the technique to be critical traffic.

Figure 3:
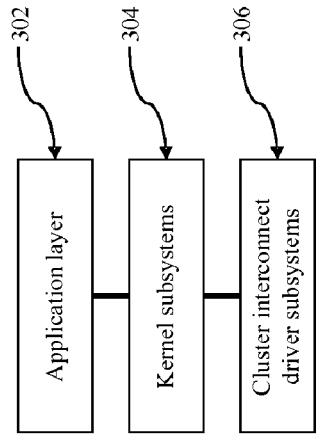
FIG. 3 shows an example of software layers for execution on a cluster computing node.

FIG. 3 shows an example of software layers which may contain software being executed on each the nodes 102 to 108. The software layers include an application layer 302, in which processes and tasks assigned to the computing node 102 to 108 are executed. Below the application layer is the kernel subsystems layer 304. The kernel subsystems are responsible for, among other things, organising traffic produced by both the application layer and other kernel subsystems. Below the kernel subsystems layer 302 is the cluster interconnect driver subsystem layer 306, which is for containing processes that are responsible for transmitting traffic provided by the kernel subsystems 304 to other cluster nodes 102 to 108 via the interconnects 110.

Embodiments of the present disclosure provide models for the organisation of cluster interconnect traffic produced by applications in the application layer 302 and by the kernel subsystems. The cluster interconnect traffic is to be sent by a node across at least one cluster interconnect. The final recipient however of the cluster interconnect traffic need not necessarily be a resource within the cluster. For example, a resource may be located on a network to which not all cluster nodes are connected. Traffic intended for this resource may be sent across at least one cluster interconnect before leaving the cluster. It follows therefore that the intended recipient of cluster interconnect traffic is not necessarily a resource or node within the cluster.

Embodiments of the disclosed technique provide cluster interconnect traffic management software which is executed in the kernel subsystems layer 32 to implement one or more of the models. Other embodiments may provide software which is executed in layers other than the kernel subsystems layer 32, and/or in multiple layers. The software may be provided to a cluster node using a computer readable storage such as, for example, a CD, DVD, ROM, flash memory or floppy disk. Alternatively the software could be downloaded or transmitted to a cluster node 102 to 108.

Figure 4:
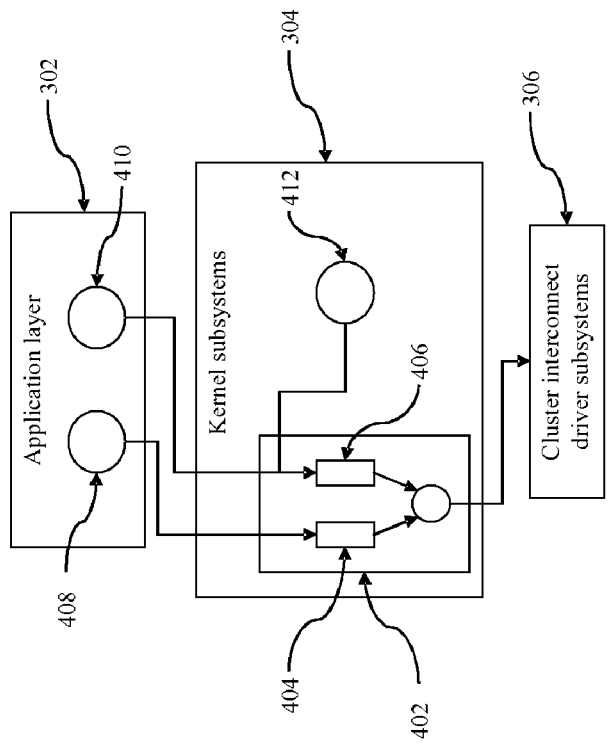
FIG. 4 shows the software layers of FIG. 3 in more detail when implemented according to a first embodiment of the present invention.

Below are provided three examples of embodiments which represent cluster interconnect traffic management models, and/or cluster resource management models. These are:
1. Low latency model for high priority traffic
2. Weighted fair queuing model
3. Alternate scheduling model Low Latency Model for High Priority Traffic A first embodiment of the disclosure, uses a low latency model to manage cluster interconnect traffic. FIG. 4 shows the software of FIG. 3 in more detail when implemented according to an example of the low latency model. The software includes cluster interconnect traffic management software 402 which implements the low latency model for high priority traffic. The software 402 implements a low priority queue 404 and a high priority queue 406.

In the embodiment of the low latency model described, data items produced by applications or kernel subsystems which are to be transmitted to other cluster nodes 102 to 108 via the interconnects 110 are assigned respective priority levels. The priority level may be a high or low priority level. Each data item is assigned a priority level by the application or subsystem which creates the data item. For example, traffic generated by processes in the kernel subsystem layer can be classed as critical and given a high priority, and traffic generated by processes in the application layer can be classed as non-critical and given a low priority. The traffic management software 402 determines the priority level of each of the data items and places each data item in the appropriate queue. However other embodiments are possible, for example where a process in the application layer (an application) is considered to generate at least some critical traffic, and the traffic considered as critical can be given a high priority level. Other embodiments are also possible where a priority level is assigned to a plurality of data items rather than to individual data items.

Two processes 408 and 410 are shown being executed in the application layer 302. The process 408 produces low priority traffic, which is placed in the low priority queue 404. The process 408 produces high priority traffic, which is placed in the high priority queue 406. In practice, the application layer may contain any number of processes, each of which may produce high or low priority traffic or both. Some processes may produce no cluster interconnect traffic.

A data item in the embodiment described herein is an IPv4 packet, although other types of data item can be used depending on the implementation of the cluster nodes 102 to 108, interconnects 110 and policies and requirements of a cluster administrator. For example, data items could be packets according to the IPv6 or SIP (Session Initiation Protocol) protocol. Alternatively, data items could comprise, among others, bytes, words and/or blocks of packets, bytes and/or words.

A kernel subsystem process 412 is also shown in the kernel subsystems layer 304 and produces high priority traffic, which is placed in the high priority queue 406. Similarly, the kernel subsystems layer 304 may contain any number of processes, each of which may produce high or low priority traffic or both. Some processes may produce no cluster interconnect traffic.

According to the model, high priority traffic (traffic that has been assigned a high priority level) is always transmitted with minimum delay, even if there is low priority traffic waiting to be transmitted. This is implemented by having a queue associated with high-priority traffic to be transmitted (a high priority queue), and a queue associated with low-priority traffic to be transmitted (a low priority queue). The high and low priority queues are not throttled, and so they do not suffer from packet loss.

The management software implements the low latency model for high priority traffic as described below, by taking traffic from the appropriate queue 404 or 406 and passing it to the cluster interconnect driver subsystem layer 306. The cluster interconnect driver subsystem layer 306 then transmit the traffic to other cluster nodes 102 to 108 via the cluster interconnects 110.

FIG. 5 shows the format of an IPv4 packet. The packet contains many items of information which are well known and not described herein. The header contains an 8-bit Type of Service (ToS) field. This is a generally unused field. The ToS field can be used in embodiments to define the priority level of the IPv4 data packet. The management software will examine the ToS field of packets produced by the processes 408, 410 and 412 (and any other processes producing traffic), and determine the correct queue for the packet from that field.

The low latency model for high priority traffic is implemented as follows. The management software 402 polls the queues to see if there are any outstanding packets to be transmitted. If any data items are present in the high priority queue 406, these are passed by the management software 402 to the cluster interconnect driver subsystem layer 306 in a FIFO manner. Once the queue is empty, the management software then starts passing data items from the low priority queue 404 to the driver subsystem layer 306 in a FIFO manner. If one or more data items subsequently arrive in the high priority queue 406, the next packet passed to the driver subsystem layer 306 by the software 402 will be from the high priority queue 406. The software 402 will subsequently pass data items from the high priority queue 406 until the queue 406 is empty, and then return to passing data items from the low priority queue 404.

The model can be implemented by the management software 402 alternately selecting each of the queues 404 and 406. When the high priority queue is selected, all high priority data items are passed to the driver subsystem layer 306 for transmission. When the low priority queue is selected, only a single data item is passed to the driver subsystem layer 306, and then the high priority queue is again selected. If the high priority queue 406 is empty, the low priority queue 404 will be selected again and a single data item (if any) passed from the queue 404 to the driver subsystem layer 306. The high priority queue 406 will then be selected and all data items therein (if any) passed to the driver subsystem layer 306.

This model guarantees low latency to high priority traffic, as high priority traffic is transmitted with a reduced delay, compared to the situation where high and low priority traffic are treated equally and/or placed in the same interconnect queue. According to this model, high priority traffic does not have to wait until earlier low priority traffic has been passed to the driver subsystems layer 306 for transmission. An administrator of the computing cluster can classify different kinds of traffic according to the needs of the cluster. For example, packets containing information relating to the release of a cluster resource could be classed as high priority such that nodes in the cluster are aware of the release with reduced delay. Thus, for example, the kernel subsystem implementing the distributed lock manager (DLM) can be implemented such that it marks resource release traffic as high priority. This will increase the efficiency of cluster resources, such as data processors or shared resources, and increase the efficiency of the cluster as a whole.

The low latency model for high priority traffic could lead to unfairness to low priority traffic, if certain applications or kernel subsystems produce much high priority traffic. Low priority traffic might in these circumstances be held in the low priority queue indefinitely, as the high priority queue is never emptied.

This model can be used, for example, where the high priority data rate is low, and is generated or transmitted in bursts. This is because the high priority traffic will be transmitted with low latency, but should not cause low priority traffic to be held in the low priority queue 404 indefinitely.

In alternative embodiments, priority levels may be assigned to the cluster interconnect traffic by the management software 402, for example depending on the origin of the traffic. For example, the management software could assign all traffic produced by kernel subsystems as high priority, and all traffic produced by applications as low priority, except for those applications marked as "high priority" applications.

Weighted Fair Queuing Model

A second embodiment uses a weighted fair queuing model for organising cluster interconnect traffic.

FIG. 6 shows the software layers of FIG. 3 in more detail when implemented using an example of the weighted fair queuing model. The kernel subsystems layer 304 includes interconnect traffic management software 602 which implements the weighted fair queuing model.

According to an example of the weighted fair queuing model, traffic is assigned one of three or more levels of priority. A FIFO interconnect queue is associated with each level of priority for holding traffic of the associated level of priority. Each priority level is also associated with a weight factor that is assigned by the cluster administrator, for example according to the needs of the cluster. In the example embodiment described below, higher priority levels have been assigned higher weight factors.

The management software 602 implements a traffic queue for each level of priority. In the example shown and described, there are four levels of priority. The management software 602 therefore implements four traffic queues 604, 606, 608 and 610, where queue 604 is associated with the lowest level of priority (priority level 0) and queue 610 is associated with the highest level of priority (priority level 3).

A process (application or kernel subsystem) that produces data items to be transmitted to other nodes 102 to 108 assigns a priority level to each data item it produces, although this assignment could be performed by other entities such as the traffic management software. The traffic management software 602 determines the priority level of each data item (for example, by examining each data item) and places each data item in the appropriate queue. In certain embodiments, the assignment is performed by the traffic management software 402.

In certain embodiments, a priority level is assigned to a plurality of data items rather than to individual data items.

The application layer 302 includes processes 408 and 410 which produce interconnect traffic. Process 408 produces traffic of the lowest level of priority (level 0). The management software 602 therefore directs traffic from this process into queue 604. On the other hand, process 410 produces traffic of priority level 2. The management software 602 therefore directs traffic from this process into queue 608.

The kernel subsystems layer 304 also includes a process 412 which produces traffic of the highest level of priority (level 3). The management software therefore directs traffic from the process 412 into queue 610.

It should be noted that there can be any number of processes in the application layer 302 and kernel subsystems layer 304 which produce interconnect traffic. These processes may also each produce traffic of different levels of priority, which is directed into the appropriate queue by the management software 602.

Traffic which is classed as critical can be given higher priority levels than traffic which is classed as critical. In addition, traffic classed as critical and/or non-critical can be further classed into priority levels. For example, critical traffic can be assigned priority level 3 (highest) and 2 (second highest), depending on the importance of the critical traffic, and non-critical traffic can be given priority level 1 (second lowest) and 0 (lowest), depending on the importance of the non-critical traffic. Alternatively, critical traffic can be assigned priority levels 3, 2, and 1, and non-critical traffic can be assigned priority level 0. Other assignments of priority levels are possible.

To carry out the weighted fair queuing model, the management software selects each queue in turn, starting with the highest priority level queue 610 and subsequently lower levels of priority. If there are data items in the selected queue waiting to be transmitted, the traffic management software 602 passes a predetermined amount of data items (for example, a certain number of packets are passed or data items are passed for a certain period of time) from the selected queue to the cluster interconnect driver subsystem layer 306. The driver subsystems then transmit this data to other nodes 102 to 108 in the cluster via the cluster interconnects 110.

The predetermined amount of data for a particular priority level is indicated by the weight factor associated with the priority level. For example, the weighted fair queuing model may specify the number of packets to pass to the driver subsystem layer 306 or a period of time in which packets are to be passed to the driver subsystem layer 306. If the selected queue contains less than the predetermined amount of data, the management software passes all of the data from the selected queue to the driver subsystem layer 306 (i.e. less than the predetermined amount for the associated priority level).

Once all of the queues have been selected once (a cycle), and the appropriate amount of data from each queue has been passed to the driver subsystem layer 306, the cycle is repeated starting from the highest priority level queue 610. Therefore in the example shown in FIG. 6, the order of the selected priority level is as follows:

3, 2, 1, 0, 3, 2, 1, 0, 3, 2, 1, 0, . . .

In an example situation where there is a substantial amount of traffic in all queues (i.e. each queue contains more than the associated predetermined amount of traffic), within a single cycle more traffic is transmitted from higher priority queues. Therefore as time passes more traffic will be transmitted from higher priority queues. As a result there is a higher data rate for higher priority traffic. However this may not be the case where there is only a small amount of higher priority traffic, and higher priority queues are emptied before the predetermined amount for that priority level has been passed to the driver subsystem layer 306.

This model also has the result that higher priority traffic effectively has a lower latency than traffic of lower priorities. A packet waiting in a higher priority queue will progress to the front of the queue more quickly than a packet waiting in a lower priority queue, and is therefore more likely to be transmitted with a lower latency. The latency of traffic in each queue however also depends on the rate of traffic arriving in the queue.

Traffic of lower priority levels will still be transmitted even when there is a large amount of higher priority traffic, because the associated lower priority queues will always be selected in a cycle. Higher priority traffic cannot therefore occupy all of an interconnect's bandwidth, and traffic will not be held in a lower priority queue indefinitely. This model therefore gives fairness to lower priority traffic.

The weighted fair queuing model can be used, for example, in a situation where the latency requirements for different types of traffic are similar, because the cluster administrator can adjust the weight factors for the queues such that the degree of preference between priority levels is small. Therefore, traffic of higher priority levels can have only a slightly lower latency and/or slightly higher data rate than traffic of lower priorities. Some priority levels may even be assigned identical weight factors if the requirements for latency or data rate are very similar or identical for the associated traffic.

It should be noted that the embodiment of the weighted fair queuing model described above selects queues in order of descending priority. This is not essential and the queues can be selected in any order. The result will be the same, in that in a single cycle, more traffic of higher priorities will be transmitted than traffic of lower priorities. It is therefore still likely that higher priority traffic will be transmitted at a higher data rate and/or the latency of higher traffic will be lower than traffic of lower priorities.

Alternate Scheduling Model

A third embodiment uses an alternate scheduling model. FIG. 7 shows the software levels of FIG. 3 in more detail when implemented using an example of the alternate scheduling model. The kernel subsystems layer 304 includes interconnect traffic management software 702, which implements the alternate scheduling model.

According to an example of this model, traffic is assigned one of three or more priority levels. Each priority level is associated with a FIFO interconnect queue. Each priority level is also associated with a weight factor, assigned by the system administrator. In the example shown and described, there are 8 priority levels, numbered 0 to 7, where 7 is the highest priority and 0 is the lowest priority. There are therefore 8 interconnect queues. In the example described herein, queues associated with higher priority levels are be given a higher weight factor.

A process (application or kernel subsystem) that produces data items to be transmitted to other nodes 102 to 108 assigns a priority level to each data item it produces. The traffic management software 702 determines the priority level of each data packet (for example, by examining the data items) and places each data item in the appropriate queue. In certain embodiments, the assignment is performed by the traffic management software 402. In certain embodiments, a priority level is assigned to a plurality of data items rather than to individual data items.

The application layer 302 includes processes 408 and 410 which produce interconnect traffic. Process 408 produces traffic of priority level 1. The management software 702 therefore directs traffic from this process into queue 704. On the other hand, process 410 produces traffic of priority level 5. The management software 702 therefore directs traffic from this process into queue 706.

The kernel subsystems layer 304 also includes a process 412 which produces traffic of the highest level of priority (level 7). The management software 702 therefore directs traffic from the process 412 into queue 708.

It should be noted that there can be any number of processes in the application layer 302 and kernel subsystems layer 304 which produce interconnect traffic. These processes may also each produce traffic of different levels of priority, which is directed into the appropriate queue by the management software 702.

Traffic which is classed as critical can be given higher priority levels than traffic which is classed as critical. In addition, traffic classed as critical and/or non-critical can be further classed into priority levels. For example, critical traffic can be assigned priority levels 7 to 4, depending on the importance of the critical traffic, and non-critical traffic can be assigned levels 3 to 0, depending on the importance of the non-critical traffic. Alternatively, critical traffic can be assigned priority levels 7 and 6, and non-critical traffic can be assigned priority levels 5 to 0. Other assignments of priority levels are possible.

To carry out the alternate scheduling model, the management software 702 selects the queues associated with the priority levels 0 to 7 in the following manner. First, the highest priority 7 queue (queue 708) is selected, and an amount of data given by the associated weight factor is taken from the queue and passed to the cluster interconnect driver subsystem layer 306 for transmission. Next, traffic from two other queues is transmitted according to their associated weight factors. The queues are selected in a cycle of descending priority from 6 to 0. For example, priority level 6 queue might be selected, and a predetermined amount of traffic is passed to the driver subsystem layer 306 as indicated by the weight factor associated with priority level 6. Next, priority level 5 queue might be selected, and an appropriate amount of traffic passed to the driver subsystem layer 306. The process is then repeated, in that the highest priority queue (associated with priority level 7) is selected, followed by the two next queues in the cycle (for example level 4 queue followed by level 3 queue). In other words, every third selected queue is the highest priority 7 queue 708.

The order of the priorities of the queues selected (and the order of priority level of transmitted traffic) will therefore be as follows:

7, 6, 5,
7, 4, 3,
7, 2, 1,
7, 0, 6,
7, 5, 4,
7, 3, 2,
7, 1, 0,
7, 6, 5,
. . .

As a result, it is likely that higher priority traffic will be transmitted at a higher data rate and/or the latency of higher traffic will be lower than traffic of lower priorities, as for the weighted fair queuing model, if higher priority queues have higher weight factors. However, in addition, the highest priority level 7 queue 708 will be selected more often than any other queue. In the example above, the level 7 queue will be selected, and data transmitted therefrom, over three times more often than any other type of queue.

As a result, data packets from the level 7 queue 708 may have a particularly low latency when compared to other queues. Packets at the front of the level 7 queue (i.e. packets which will be transmitted the next time the queue is selected) must wait while up to two other queues are selected and data is transmitted therefrom. On the other hand, packets at the front of other queues must wait while up to ten other queues are selected (including the level 7 queue 708 a number of times).

Furthermore, traffic from the level 7 queue may have a higher data rate than traffic from other queues, because it is selected more often than other queues and also may be associated with a higher weight factor than other queues.

In alternative embodiments, the queues apart from the highest priority level 7 queue 708 can be selected in any order. This will not affect the performance of the model for similar reasons as for the weighted fair queuing model.

Furthermore the system administrator may in certain embodiments give a weight factor to the highest priority level 7 queue 708 which is not the highest weight factor. For example the weight factor associated with priority level 7 is lower than that given to priority level 6. Traffic transmitted from the level 7 queue may still have the highest data rate and/or lowest latency as the level 7 queue is selected more often than other queues.

In certain embodiments, the queues may be selected in a different manner. For example, the level 7 queue might be selected followed by any number of other queues, for example one or three other queues. As a result, the level 7 queue will still be selected more than any other type of queue and traffic transmitted therefrom. It is therefore likely that traffic from the level 7 queue 708 will have a higher data rate and/or lower latency than traffic from other queues. The frequency at which the highest priority queue is selected compared to other queues can be set by the cluster administrator according to the needs of the cluster as well as the number of priority levels implemented in the alternate scheduling model.

It is also possible for different nodes in a single computing cluster to implement different traffic management models.

According to embodiments, each node in the cluster has access to a configuration file which is used by the node to determine which traffic management model to implement. An example of a configuration file is given below, which selects the alternate scheduling model:

/etc/configcluster.conf

supported entries are
LLQ: Low Latency Queuing
WFQ: Weighted Fair Queuing
ALQ: Alternate Scheduling Model
qosmode: ALQ In the above example, blank lines and lines beginning with the '#' character are ignored. Comments and information can therefore be embedded in the configuration file. The keyword 'qosmode:' is followed by three letters which indicate to the node which traffic management model to implement.

In certain embodiments, where there are, for example, multiple interconnects between two nodes, a higher bandwidth and/or lower latency interconnect is selected to distribute higher priority traffic. This also provides a higher data rate and/or lower latency for higher priority traffic. The bandwidth of interconnects is fixed by the hardware used. A kernel subsystem can query the hardware to determine the bandwidth of interconnects.

All of the above embodiments of the present disclosure provide a lower latency service and/or higher data rate to higher priority traffic in a computing cluster during times of high traffic rates. When low latency interconnect hardware is used such as Memory Channel, embodiments provide even lower latency and/or higher data rate for higher priority traffic during times of high traffic rates.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The disclosed technique is not restricted to the details of any foregoing embodiments. The technique extends to any novel one, or any novel combination, of the features disclosed in this specification (including any accompanying claims, abstract and drawings), or to any novel one, or any novel combination, of the steps of any method or process so disclosed.

The invention claimed is:

1. A method, implemented by programming on a suitable processor, of managing cluster interconnect traffic among a plurality of cluster nodes in a computer system, the method, comprising:
   at each cluster node, prioritising the cluster interconnect traffic using at least two priorities and placing data items of the prioritized cluster interconnect traffic in queues of respective priority levels; and
   distributing the prioritised cluster interconnect traffic according to the prioritizing, such that at each cluster node, the cluster interconnect traffic in a first priority class is distributed with at least one of a higher data rate and a lower latency than cluster interconnect traffic in a second priority class;
   wherein distributing comprises distributing predetermined amounts of traffic from the queues, and wherein the predetermined amount of traffic to be distributed from each queue is based on the priority level of each such queue with the predetermined amount of traffic distributed from a higher priority queue being greater than the predetermined amount of traffic from a lower priority queue.

2. A method as claimed in claim 1, wherein the step of prioritising comprises determining respective priority levels of data items of the cluster interconnect traffic.

3. A method as claimed in claim 2, wherein the step of determining comprises determining whether a respective priority level of each data item is high or low.

4. A method as claimed in claim 2, wherein determining comprises determining at least three priority levels of respective data items.

5. A method as claimed in claim 2, wherein the step of determining comprises inspecting a respective indication associated with each of the data items.

6. A method as claimed in claim 1, wherein the step of prioritising comprises assigning respective priority levels to data items of the cluster interconnect traffic.

7. A method as claimed in claim 2, wherein the step of prioritising comprises categorising the traffic into at the least first and second priority classes, assigning one or more first priority levels to traffic in the first priority class, and assigning one or more second priority levels to traffic in the second priority class, wherein the one or more first priority levels are higher than the one or more second priority levels.

8. A method as claimed in claim 7, comprising classifying traffic produced by a kernel subsystem into the first priority class.

9. A method as claimed in claim 7, comprising classifying traffic containing information relating to release of a cluster resource into the first priority class.

10. A method as claimed in claim 1, wherein the predetermined amount for each queue is indicated by a weight factor associated with the priority level of each such queue.

11. A method as claimed in claim 1, wherein the predetermined amount of traffic comprises at least one of a respective number of data items and a respective volume of traffic.

12. A method as claimed in claim 1, wherein distributing comprises distributing traffic from a highest priority queue more often than other queues.

13. A method as claimed in claim 12, wherein every third selected queue is the highest priority queue.

14. A method as claimed in claim 1, wherein the intra-cluster traffic comprises IPv4 or IPv6 packets.

15. A method as claimed in claim 14, wherein the intra-cluster traffic comprises IPv4 packets and the Type of Service (field) of each packet indicates the priority level of the packet.

16. A method as claimed in claim 1, wherein the step of distributing further comprises distributing higher priority traffic using a higher bandwidth cluster interconnect.

17. A method, implemented by programming on a suitable processor, of controlling cluster resources among a plurality of cluster nodes in a computer system, the method, comprising:
   at each cluster node, categorising cluster interconnect traffic into at least first and second classes, wherein traffic in the first class comprises at least one of critical traffic capable of influencing at least one of access to and performance of a cluster resource and critical traffic controlling a cluster resource;
   storing the interconnect traffic into queues having priority levels corresponding to the classes with traffic in a given class being stored in a queue having a corresponding priority level; and
   distributing the categorised cluster interconnect traffic to one or more cluster resources such that cluster interconnect traffic in the first class is distributed with at least one of a higher data rate and a lower latency than cluster interconnect traffic in the second class;
   wherein distributing comprises selecting traffic from each queue for a predetermined amount of time that is based on the priority level of each such queue, with the predetermined amount of time being greater for a higher priority queue than a lower priority queue.

* * * * *

UNITED STATES PATENT AND TRADEMARK OFFICE
CERTIFICATE OF CORRECTION

PATENT NO. : 8,149,846 B2  
APPLICATION NO. : 11/558082  
DATED : April 3, 2012  
INVENTOR(S) : Rishi Kaundinya Mutnuru et al.

It is certified that error appears in the above-identified patent and that said Letters Patent is hereby corrected as shown below:

In the Drawings:

In Sheet 1 of 3, line 1, Figure 1, above "Figure 2" insert -- 100 --.

In Sheet 1 of 3, line 1, Figure 2, below "Box 204" insert -- 200 --.

In Sheet 1 of 3, line 1, Figure 3, below "Box 306" insert -- 300 --.

In Sheet 1 of 3, line 1, Figure 4, below "Box 306" insert -- 400 --.

In Sheet 2 of 3, line 1, Figure 5, below "Data" insert -- 500 --.

In Sheet 2 of 3, line 1, Figure 6, below "Box 306" insert -- 600 --.

In Sheet 3 of 3, line 1, Figure 7, below "Box 306" insert -- 700 --.

Signed and Sealed this  
Eighth Day of October, 2013

Teresa Stanek Rea  
*Deputy Director of the United States Patent and Trademark Office*